United States Patent [19]

Gareh et al.

[11] Patent Number: 5,481,541
[45] Date of Patent: Jan. 2, 1996

[54] METHOD OF OPERATION OF REMOTE DATA/CONTROL APPARATUS WITH CONTROLLED RESPONSE TIMING

[75] Inventors: Oded Gareh; Haim Geller, both of Tel Aviv; Yitzhak Cohen, Yahud, all of Israel

[73] Assignee: Motorola, Inc., Schaumburg, Ill.

[21] Appl. No.: 929,321

[22] Filed: Aug. 13, 1992

[30] Foreign Application Priority Data

Sep. 7, 1991 [GB] United Kingdom ............. 9119186

[51] Int. Cl.⁶ ................................... H04L 12/413
[52] U.S. Cl. ............... 370/85.2; 370/85.3; 370/95.1
[58] Field of Search ............ 370/85.2, 85.6–85.8, 370/95.1–95.2, 108, 95.3, 85.3; 340/825.07, 825.08, 825.54, 825.5; 375/107, 106; 455/33.1–33.2, 34.1–34.2, 54.1–54.2, 53.1, 56.2, 62

[56] References Cited

U.S. PATENT DOCUMENTS

| | | | |
|---|---|---|---|
| 4,472,802 | 9/1984 | Pin et al. | 370/108 |
| 4,689,619 | 8/1987 | O'Brien | 340/825.08 |
| 4,742,335 | 5/1988 | Vogt | 340/825.08 |
| 4,803,679 | 2/1989 | Shimizu | 455/34.2 |
| 4,940,947 | 7/1990 | Sojka | 340/825.08 |
| 5,103,448 | 4/1992 | Barnes et al. | 370/95.2 |
| 5,122,794 | 6/1992 | Warrior | 370/85.3 |
| 5,177,739 | 1/1993 | Basnuevo et al. | 370/85.8 |

*Primary Examiner*—Douglas W. Olms
*Assistant Examiner*—Chau T. Nguyen

[57] ABSTRACT

This invention relates to communications apparatus, such as remote data/control apparatus. A first unit (10) and a second unit (11) are arranged to exchange messages over a communication channel. To avoid collision between responses between different remote units, the first unit has device for requesting a response from the second unit and circuit for communicating to the second unit a value (23) representing a time delay and the second unit has device for monitoring the channel, determining when the channel becomes free and transmitting its response to the first unit delayed by that time delay after the channel becomes free.

4 Claims, 1 Drawing Sheet

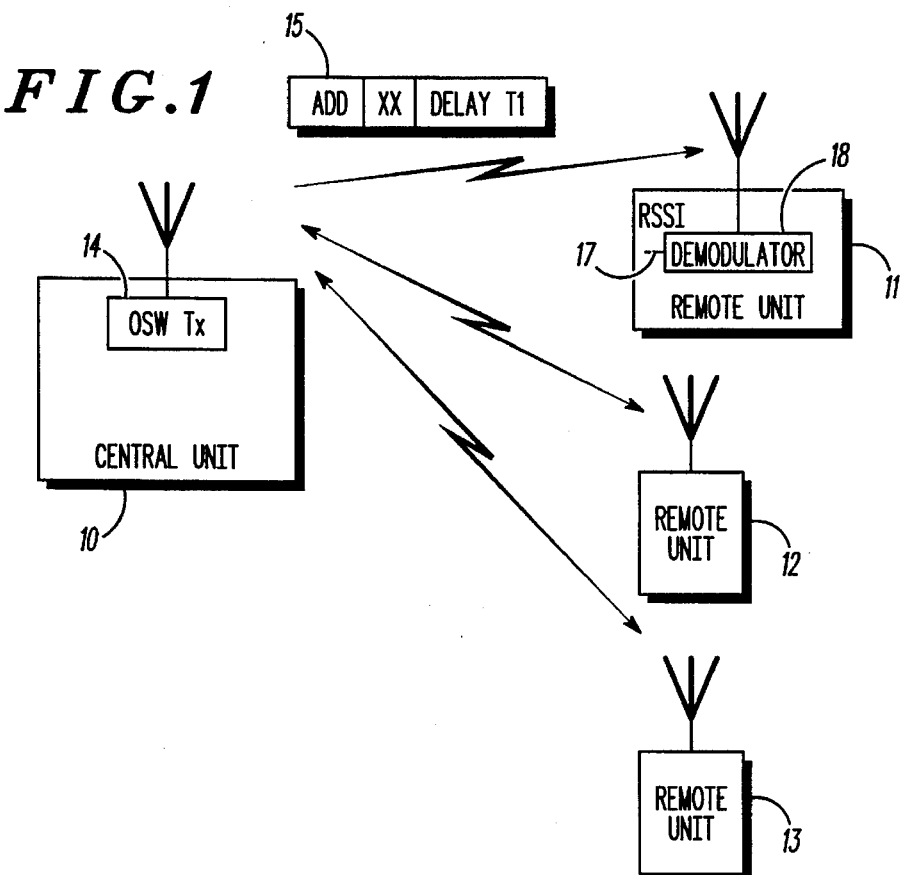
FIG.1
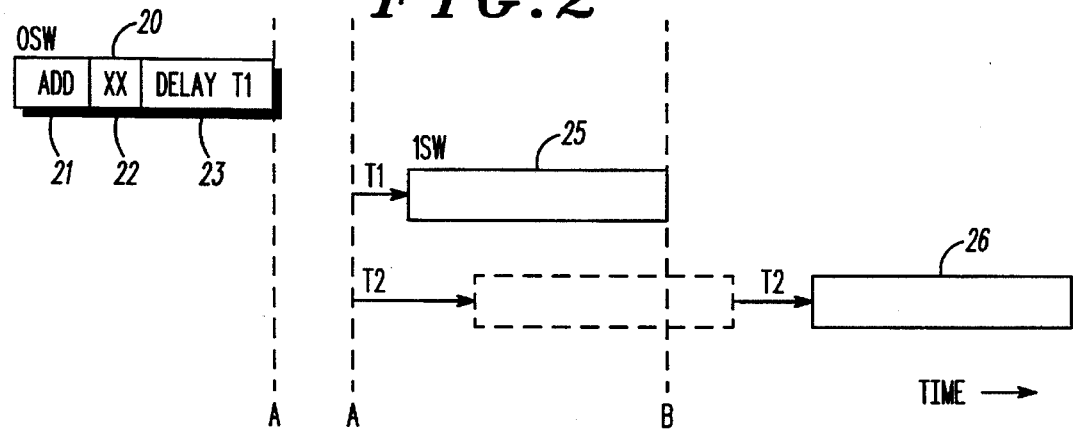
FIG.2
| RTU | TIME SLOT | DELAY (RANGE 10-200ms) |
|---|---|---|
| 11 | 1 | 20ms |
| 12 | 2 | 40ms |
| 13 | - | - |
FIG.3

METHOD OF OPERATION OF REMOTE DATA/CONTROL APPARATUS WITH CONTROLLED RESPONSE TIMING

BACKGROUND OF THE INVENTION

This invention relates to communications apparatus, such as remote data/control apparatus. The invention relates to improvements in communication protocols and communication systems having several remote terminal units and one or more master control centres communicating by radio, serial ports, dedicated lines and/or telephone lines.

Typical applications include, but are not limited to supervisory control and data acquisition (SCADA) for water and waste water systems, electric utility distribution systems, oil and gas pipelines, early warning siren systems, communication control systems, irrigation control systems and roadside emergency callbox systems.

SUMMARY OF THE PRIOR ART

It is a problem that in communication systems comprising a number of units trying to communicate over the same communication channel, collisions occur where different units try to gain access to the channel simultaneously.

In known communications systems, different units are allocated fixed priorities, and gain access according to their pre-assigned priorities UK Patent Application No. 2236606A describes a communications system for data acquisition and control in which a contention period is provided during which different remote units can contend for access to the central unit. Different remote units request polling during contention time-slots and are then polled by the central unit during a polling period. When traffic is light, the contention period is reduced so that the remote units can be polled more frequently. Nevertheless, polling does not begin until the contention period ends, irrespective of the number of units contending for polling. The aforesaid arrangement does not address the reverse situation in which a central unit calls for a response from a remote unit.

SUMMARY OF THE INVENTION

In accordance with the invention, communications apparatus is provided comprising a first unit and a second unit arranged to exchange messages over a communication channel, wherein the first unit has means for requesting a response from the second unit and means for communicating to the second unit a value representing a time delay and the second unit has means for monitoring the channel, determining when the channel becomes free and transmitting its response to the first unit delayed by said time delay after the channel becomes free, whereby the first unit is able to control the timing of responses from a number of said units and avoid collision between responses from said units.

BRIEF DESCRIPTION OF DRAWINGS

FIG. 1 illustrates a remote data/control system in accordance with the prepared embodiment of the invention.

FIG. 2 illustrates signals transmitted between the units of FIG. 1.

FIG. 3 shows a table maintained in the central unit of FIG. 1.

A preferred embodiment of the invention will now be described by way of example, with reference to the drawings.

PREFERRED EMBODIMENT OF THE INVENTION

Referring to FIG. 1, there is shown a central unit 10 and three remote units 11, 12 and 13. The remote units are typically data acquisition and control units which are connected to systems to be monitored or controlled, such as irrigation systems, alarm systems etc. The central unit 10 communications with the remote units 11, 12 and 13 in this example over a radio channel.

The central unit 10 has means 14 for transmitting an outbound signalling word 15 (OSW). As is described below, the OSW is interpreted by a receiving unit as a request for a response. Thus, the means 14 can be considered to be a means for requesting a response from another unit.

Each of the remote units 11, 12 and 13 is able to monitor the channel and determine when the channel is free—i.e. when neither the central unit 10 nor any other remote unit is communicating on the channel. The means for monitoring the channel comprise a received signal strength indicator in the demodulator on the receiver side of the unit, as is well known in the art (see, for example EP-B-0142503 or GB-A-2012525).

When the central unit 10 wishes to receive data from a remote unit 11, it "polls" that remote unit by transmitting the address of that remote unit and an instruction, which the remote unit interprets as a request for certain data. The data may be, for example, the status of an alarm, the flow rate through a valve etc.

In response to an outbound signalling word (OSW) from the central unit 10 to a remote unit (e.g. unit 11), with an instruction requesting data, the remote unit 11 transmits an inbound signalling word (ISW) with the data requested. The transmission of the ISW can, however, only take place when the channel is free—i.e. when neither the central unit 10 nor any other remote unit 12 or 13 is transmitting. This requirement is satisfied in a manner illustrated in FIG. 2.

Referring to FIG. 2, the central unit 10 transmits an OSW 20 comprising the address 21 of the remote unit 11, an instruction 22 and a value 23 representing a delay T1. At the end of the OSW 20, at point A on the time axis, the channel becomes free. At this time, the remote unit 11, and any other remote unit, e.g. unit 12, that wishes to transmit to the central unit 10 measures the signal strength on the channel, and determines that this has dropped below a threshold, and determines that the channel is free. (In FIG. 2, it is illustrated that the unit 11 is not necessarily immediately ready to make its response; in practice there may be a delay between the channel becoming free and the unit 11 being ready to respond. This delay extends to time A', but this is immaterial for present purposes). The unit waits a time T1 before transmitting its ISW. After delay T1, unit 11 transmits its ISW including the data requested. In the meantime, unit 12 has also noted that the channel became free at point A, and unit 12 has initiated a delay T2 before transmitting its ISW. The delay T2 may be initiated as a result of an earlier instruction from the central unit 10, or it may be a default delay. At the end of the delay T2, a channel is no longer available, because unit 11 is transmitting its ISW 25. Thus, the ISW 26 from unit 12 is not transmitted (indicated by dotted outline in FIG. 2), and instead unit 12 again waits for the channel to become free. When the channel becomes free at point B, unit 12 again waits an amount equal to the delay T2 and finally transmits its ISW 26 after that delay.

In this manner, unit 11 took precedence over unit 12 in transmitting its ISW, because the delay in unit 11 was shorter than the delay in unit 12. The priority allocated to unit 11 over unit 12 was allocated by central unit 10 by means of the delay information 23 contained in the OSW. In this way, unit 10 has control over the priority allocation between the remote units 11, 12 and 13 in a simple manner over a single channel.

The delay information 23 can take the form of a number of discrete delay values. Each of these discrete delay values represents a time slot during which the remote unit will transmit its response. The central unit 10 stores a table correlating addresses of remote units with time slots. This table is shown in FIG. 3.

As illustrated in that Figure, remote unit (RTU) 11 has been allocated time slot 1 corresponding to a delay of 20 milliseconds and RTU 12 is allocated time slot 2 corresponding to a delay of 40 milliseconds. These delays represent the time each unit waits after any channel becomes free before transmitting.

When the central unit 10 receives an ISW from a remote unit, it releases the time slot previously allocated to that unit, for future allocation. Thus, in the table shown, RTU 13 has no time slot allocated to it, because the central unit 10 is not awaiting any response. Thus the central unit 10 can allocate any time slot from time slot 3 upwards to RTU 13.

When a remote unit wishes to report to the central unit without first being instructed by the central unit (e.g. to report an emergency), the remote unit allocates a time slot to itself, which may be a default time slot such as the first or last time slot or it may be a time slot plus offset (i.e. a time sub-slot) which may be unique to that unit or is pseudo-random.

The time delay T1, T2 etc. and thus the position of the time slots is fixed, but is optimised according to the minimum sensitivity of the communication channel, i.e. how fast a remote unit recognises channel monitor (busy channel) after another remote unit has activated its push-to-torque. Thus the response time to the first message attempt from the centre is independent of the remote unit addresses, and the desired function is achieved of remote units responding optimally without collisions.

The number of assigned time-slots is limited per transmission burst, so that there will be no need to assign one time-slot for each remote unit, since this would considerably prolong the response time. Thus a system with 100 remote units, may utilise, say, only four time-slots. Once an remote unit has responded in its time-slot, this time-slot becomes free and can be used again by another remote unit in the next transmission.

It should be noted that if the first transmission fails for any reason, subsequent responses from the remote unit revert to a response scheme similar to prior art schemes, i.e. using a pseudo-random delay based on the remote unit address but multiplied by the minimum channel selectivity time (typically 100 milliseconds). This is done in order to increase the probability of success, if the first time-slot technique did not succeed for any reason. The use of the channel sensitivity time as a factor even to subsequent responses, as proposed by this invention, adds a new level of channel optimization and probability of success not available in prior art systems.

We claim:

1. A method of operation of remote data/control apparatus comprising a first unit, a second unit arranged to exchange messages with the first unit over a communication channel, and a third unit arranged to exchange messages with the first unit over the communication channel, the method comprising the steps of:

at the first unit:

selecting first and second time delays, where said second time delay is greater than said first time delay;

communicating to the second unit a value representing said first time delay;

communicating to the third unit a value representing said second time delay;

requesting responses from the second and third units;

at the second unit:

monitoring the channel;

determining when the channel becomes free;

responsive to the channel becoming free at a first determined time, waiting said first time delay from said first determined time; and transmitting a response to the first unit delayed by said second time delay after said determined time;

at the third unit:

monitoring the channel;

determining when the channel becomes free;

responsive to the channel becoming free at said first determined time, waiting said second time delay from said first determined time;

responsive to the channel not being free after said second time delay, determining when the channel again becomes free at a second determined time;

responsive to the channel becoming free at said second determined time, waiting said second time delay from said second determined time; and transmitting a response to the first unit delayed by said second time delay after said second determined time;

whereby the values representing the first and second time delays transmitted by the first unit control the timing of responses from the second and third units when the second and third units contend for access to the channel.

2. A method of operation of remote data/control apparatus comprising a first unit, a second unit arranged to exchange messages with the first unit over a communication channel, and a third unit arranged to exchange messages with the first unit over the communication channel, the method comprising the steps of:

at the first unit:

selecting a time delay;

communicating to the second unit a value representing said time delay;

requesting a response from the second unit;

at the second unit:

monitoring the channel;

determining when the channel becomes free;

responsive to the channel becoming free at a first determined time, waiting said time delay from said first determined time;

responsive to the channel not being free after said time delay, determining when the channel again becomes free at a second determined time;

responsive to the channel becoming free at said second determined time, waiting said time delay from said second determined time; and transmitting a response to the first unit delayed by said time delay after said second determined time;

whereby the value representing the time delay transmitted by the first unit controls timing of response from the second unit when the second unit contends for access to the channel.

3. A method according to claim 2 comprising the further step of, at the second unit, transmitting a message independent of any request from the first unit, where said step of transmitting comprising the step of delaying transmission of the message by a predetermined time after the channel is determined to be free.

4. A method of operation of remote data/control apparatus comprising a first unit, a second unit arranged to exchange messages with the first unit over a communication channel, and a third unit arranged to exchange messages with the first unit over the communication channel, the method comprising the steps of:

at the first unit:

(a) selecting a time delay from a predetermined number of time delays corresponding to a predetermined number of timeslots;

(b) communicating to the second unit a value representing said time delay; and (c) requesting a response from the second unit;

at the second unit:

(d) monitoring the channel, and determining when the channel becomes free;

(e) responsive to the channel becoming free at a determined time, waiting said selected time delay from said determined time; and (f) transmitting a response to the first unit delayed by said time delay after said determined time; and, at the first unit:

(g) reselecting said time delay;

(h) communicating to the third unit a value representing said reselected time delay;

(i) requesting a response from the third unit; and at the third unit, repeating steps (d) to (e);

whereby a timeslot allocated to the second unit is reallocated to the third unit after the second unit has responded.

* * * * *